(12) United States Patent
Yi (10) Patent No.: US 12,147,448 B2
(45) Date of Patent: Nov. 19, 2024

(54) DATA READING METHOD, DEVICE AND STORAGE MEDIUM

(71) Applicant: BEIJING BAIDU NETCOM SCIENCE TECHNOLOGY CO., LTD., Beijing (CN)

(72) Inventor: Zhengli Yi, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 73 days.

(21) Appl. No.: 18/088,712

(22) Filed: Dec. 26, 2022

(65) Prior Publication Data

US 2023/0132173 A1  Apr. 27, 2023

(30) Foreign Application Priority Data

Dec. 31, 2021  (CN) .......................... 202111667195.1

(51) Int. Cl.
G06F 7/02       (2006.01)
G06F 16/00      (2019.01)
G06F 16/22      (2019.01)
G06F 16/27      (2019.01)

(52) U.S. Cl.
CPC .............. *G06F 16/27* (2019.01); *G06F 16/22* (2019.01)

(58) Field of Classification Search
CPC .................................. G06F 16/27; G06F 16/22
See application file for complete search history.

(56) References Cited

U.S. PATENT DOCUMENTS

| | | | |
|---|---|---|---|
| 10,733,201 B1* | 8/2020 | Chen ................... | G06F 11/1402 |
| 11,789,971 B1* | 10/2023 | Kuppahally ............ | G06F 16/27 |
| | | | 707/634 |
| 2011/0258483 A1* | 10/2011 | Elson .................. | G06F 11/1662 |
| | | | 714/4.11 |
| 2020/0349036 A1* | 11/2020 | Sathavalli ........... | G06F 11/0727 |
| 2021/0173788 A1 | 6/2021 | Dalmatov | |
| 2021/0208987 A1 | 7/2021 | Hao et al. | |

FOREIGN PATENT DOCUMENTS

CN            113656501 A        11/2021

OTHER PUBLICATIONS

Office Action for Chinese Application No. 202111667195.1, dated Sep. 14, 2022, 8 pages.

* cited by examiner

*Primary Examiner* — Bruce M Moser
(74) *Attorney, Agent, or Firm* — Lippes Mathias LLP (57) ABSTRACT

The present disclosure provides a data reading method, including: in response to receiving a read response request generated by a replication group for an application and sent by a storage terminal, setting, in a dedicated mapping table corresponding to the application, a commit index corresponding to the replication group as a commit index carried by the read response request; searching for a target replication group corresponding to a first read request generated by a target application based on the first read request; determining, in a dedicated mapping table corresponding to the target application, a commit index corresponding to the target replication group as a target commit index; sending a second read request carrying the target commit index to the storage terminal; and obtaining the data read by the storage terminal.

15 Claims, 6 Drawing Sheets

DATA READING METHOD, DEVICE AND STORAGE MEDIUM

CROSS-REFERENCE TO RELATED APPLICATION

This application claims priority to Chinese Patent Application No. 202111667195.1, filed on Dec. 31, 2021, the entire disclosure of which is incorporated herein by reference.

FIELD

The present disclosure relates to a field of data processing technologies, particularly to distributed data storage technology.

BACKGROUND

Distributed storage systems built based on distributed consistency algorithms can maintain the consistency of metadata, so they are widely used in various application scenarios to store data in a distributed way.

SUMMARY

According to a first aspect of the present disclosure, a data reading method is provided. The data reading method includes:
  in response to receiving a read response request generated by a replication group for an application and sent by a storage terminal, setting, in a dedicated mapping table corresponding to the application, a commit index corresponding to the replication group as a commit index carried by the read response request, in which a read request responded by the read response request is configured to read data from a leader replica of the replication group, the read response request is generated after the application reads data from the replication group, and the read response request carries a commit index of the replication group;
  searching for a target replication group corresponding to a first read request generated by a target application based on the first read request;
  determining, in a dedicated mapping table corresponding to the target application, a commit index corresponding to the target replication group as a target commit index;
  sending a second read request carrying the target commit index to the storage terminal, in which the second read request is configured to drive the storage terminal to read data requested by the first read request from a replica having an apply index being not smaller than the target commit index; and
  obtaining the data read by the storage terminal.

According to a second aspect of the present disclosure, an electronic device is provided. The electronic device includes:
  at least one processor; and
  a memory communicatively connected with the at least one processor;
  the memory stores instructions that can be executed by the at least one processor, and the instructions are executed by the at least one processor to enable the at least one processor to execute the method described in any of the first aspects.

According to a third aspect of the present disclosure, a non-transitory computer readable storage medium has computer instructions stored thereon is provided. The computer instructions are configured to cause a computer to execute the method according to any one of the first aspect.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
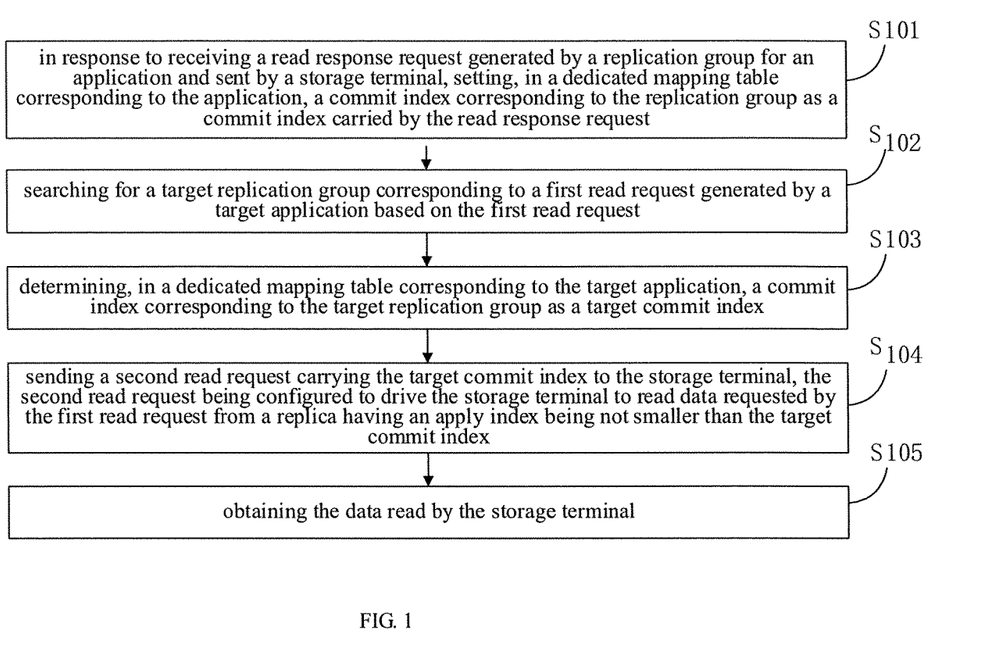
FIG. 1 is a flowchart of a data reading method according to an embodiment of the present disclosure.

As illustrated in FIG. 1, FIG. 1 is a flow chart of a data reading method according to an embodiment of the present disclosure. The data reading method provided by the disclosure is performed by a client in a distributed storage system. The distributed storage system further includes a storage terminal. The storage terminal includes a plurality of replication groups, each replication group is composed of a leader replica and at least one follow replica, and the leader replica and the follow replica in the same replication group are used to store the same data. The data reading method provided by the disclosure includes:

S101, in response to receiving a read response request generated by a replication group for an application sent by a storage terminal, a commit index corresponding to the replication group is set as a commit index carried by the read response request in a dedicated mapping table corresponding to the application, a read request responded by the read response request is configured to read data from a leader replica of the replication group, the read response request is generated after the application reads data from the replication group, and the read response request carries a commit index of the replication group.

S102, a target replication group corresponding to a first read request generated by a target application is searched for based on the first read request.

S103, in a dedicated mapping table corresponding to the target application, a commit index corresponding to the target replication group is determined as a target commit index.

S104, a second read request carrying the target commit index is sent to the storage terminal, in which the second read request is configured to drive the storage terminal to read data requested by the first read request from a replica having an apply index being not smaller than the target commit index.

S105, the data read by the storage terminal is obtained.

With this embodiment, the target commit index is used to read data from the storage terminal. The target commit index is the commit index corresponding to the target replication group in the dedicated mapping table, after the target application reads the data from the leader replica of the target replication group, the commit index corresponding to the target replication group in the dedicated mapping table corresponding to the target application may be set as the commit index of the target replication group. At this time, the commit index of the target replication group can be regarded as a log index of a log latest committed when the target application reads data from the leader replica of the target replication group. The commit and application of logs are proceed one by one. Thus, if an apply index of a replica is not smaller than the log index, it can be determined that the replica has applied a log of a write request for writing data required by the target application to a state machine of the replica, That is, the replica contains all the data that the target application needs to read. Therefore, the data requested by the target application can be successfully read from the replica whose apply index is not smaller than the target commit index. At this time, there may be other applications that write data in the target replication group after the target application reads data from the leader replica in the target replication group, thus the target commit index is often smaller than the commit index of the target replication group. It can be seen that, compared with the number of replicas whose apply indexes are not smaller than the commit index of the target replication group, the number of replicas whose apply indexes are not smaller than the target commit index in the target replication group is larger. Therefore, when reading data from the distributed storage system, it is easier to find the replica whose apply index is not smaller than the target commit index from the replicas, that is, it takes less time to find the replicas whose apply indexes are not smaller than the target commit index, so it can effectively improve the efficiency of reading data from the distributed storage system.

In addition, in the data reading method provided in the present disclosure, the commit index corresponding to the replication group in the dedicated mapping table is updated after the application reads the leader replica of the replication group. Therefore, even if the target application does not write to the target replication group, the target commit index can be determined, so that data can be successfully read from the follow replica. If the commit index corresponding to the replication group in the dedicated application table is set according to the commit index carried in a write response request, the target commit index can be determined from the dedicated mapping table after the target application performs at least one write operation on the target replication group. Especially for an application with more reads and less writes, it takes a long time for the target application to perform the first write operation on the target replication group, which is inefficient. With the data reading method provided in the present disclosure, data can be accurately read from the follow replica in the distributed storage system without waiting for the target application to perform the write operation on the target replication group. Therefore, the delay when reading data from the distributed storage system is lower, which can effectively improve the user experience.

In S101, the storage terminal can be a device having a storage capability, which is composed of a plurality of physical and/or virtual storage devices. The storage terminal may include the target replication group, and the storage terminal may also include other replication groups in addition to the target replication group. In a situation that the storage terminal contains a plurality of replication groups, in order to distinguish the target replication group from other replication groups, the client can carry a group identifier of the target replication group in the second read request. The group identifier is used to drive the storage terminal to determine the target replication group according to the group identifier. The group identifier can be any form of identifier, and is used to uniquely identify the replication group. That is, different replication groups have different group identifiers, and the replication groups identified by the same group identifier are the same.

Different applications correspond to different dedicated mapping tables, which are used to record the correspondence between replication groups and commit indexes. The form of the dedicated mapping table may vary with application scenarios, including but not limited to tables, texts, pictures, etc. For example, in a possible embodiment, the dedicated mapping table can be represented in the form of Table 1:

TABLE 1 an example of a dedicated mapping table

| replication group | commit index |
| --- | --- |
| Rg_id1 | commit index 1 |
| Rg_id2 | commit index 3 |

Where, Rg_id1 and Rg_id2 are group identifiers, if Rg_id1 is a group identifier of the first replication group, row 2 in Table 1 indicates that a commit index corresponding to replication group 1 is commit index 1.

The commit index of the replication group carried by the read response request is a commit index of the replication group when the application reads the replication group. It can be understood that a client often contains a plurality of applications. Therefore, after the application reads data from the leader replica of the target replication group, other applications may write data into the target replication group, which changes the commit index of the target replication group. Therefore, the commit index carried in the read response request is smaller than or equal to the latest commit index of the replication group.

In S102, the target application can be any application on the client. The target replication group is a replication group requested by the first read request generated by the target application. The target replication group includes one leader replica and a plurality of follow replicas. The data requested by the first read request is the data that the target application needs to use when running, and the data requested by the first read request is written data of the target replication group, that is, the data requested by the first read request may be written into the target replication group in advance. The first read request carries an identifier used to identify the target replication group, such as the aforementioned group identifier, so that the client can find the target replication group according to the identifier.

In S103, if the commit index corresponding to the target replication group in the dedicated mapping table corresponding to the target application changes after S101 is executed, the target commit index is a commit index of the target replication group when the target application reads the leader replica of the target replication group.

In S104, if an apply index of a replica is not smaller than the target commit index, it can be determined that full data is written into the replica. The full data refers to data written into the target replication group when and before the target application reads from the leader replica of the target replication group.

It can be understood that, if the target application successfully reads data from the leader replica of the target replication group, it is determined that the leader replica contains all the data that the target application needs to read, and the data in the leader replica is the aforementioned full data. Therefore, the full data includes all the data that the target application needs to read. Therefore, if an apply index of a replica is not smaller than the target commit index, the replica stores all the data that the target application needs to read.

The second data read request can also carry a data identifier used to identify the data requested by the first read request. The data identifier is used to drive the storage terminal to read the data requested by the first read request according to the data identifier.

In S105, the data sent by the storage terminal may be received. The data sent by the storage terminal is the data requested by the first read request that is read by the storage terminal from the replica whose apply index is not smaller than the target commit index. Or, the storage terminal may write the data read into a preset storage medium, and the client can read the data from the preset storage medium.

In order to more clearly explain the data reading method provided in the present disclosure, an exemplary description of a possible application scenario of the data reading method provided in the present disclosure will be given below. It can be understood that the following example is only a possible application scenario of the data reading method provided in the present disclosure. In other possible embodiments, the data reading method provided in the present disclosure can also be applied to other possible application scenarios, which is not limited in the following examples.

A distributed storage system built based on a distributed consistency algorithm can include a replication group consisting of a plurality of replicas. In each replication group, one replica is a leader replica and the other replicas are follow replicas. A client can access the distributed storage system through the leader replica. Metadata consistency between the leader replica and the follow replica is maintained through Raft.

Figure 2:
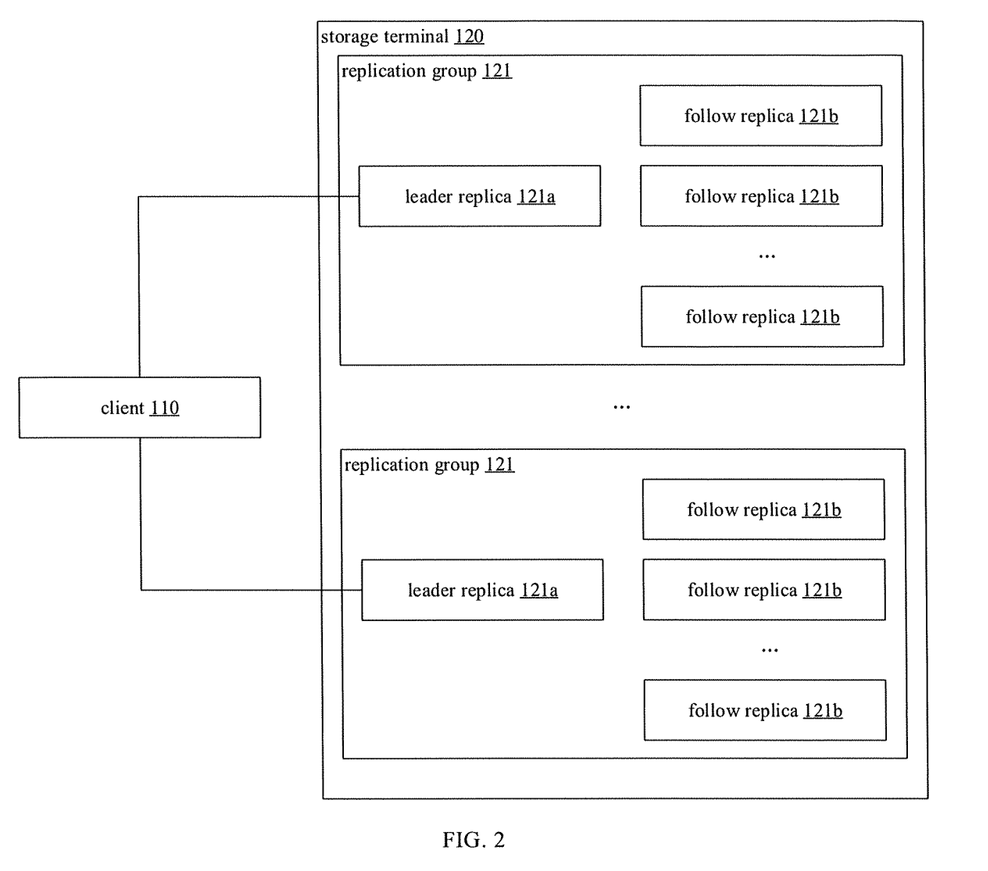
FIG. 2 is a block diagram of a Raft-based distributed storage system according to an embodiment of the present disclosure.

For example, a structure of a distributed storage system built based on the Raft can be as shown in FIG. 2, including a client 110 and a storage terminal 120. The storage terminal 120 is composed of a plurality of storage nodes. The plurality of storage nodes can all be physical storage nodes or can all be virtual storage nodes. Or a part of the plurality of storage nodes can be physical storage nodes, and the other part can be virtual storage nodes. The plurality of storage nodes are divided into a plurality of replication groups 121. Storage nodes in each replication group 121 are used to store the same data, that is, each storage node in a replication group 121 can be regarded as a replica of other storage nodes in the same replication group 121. Therefore, these storage nodes are referred to as replicas in the following. Each replication group 121 includes one leader replica 121*a* and a plurality of follow replicas 121*b*.

Figure 3:
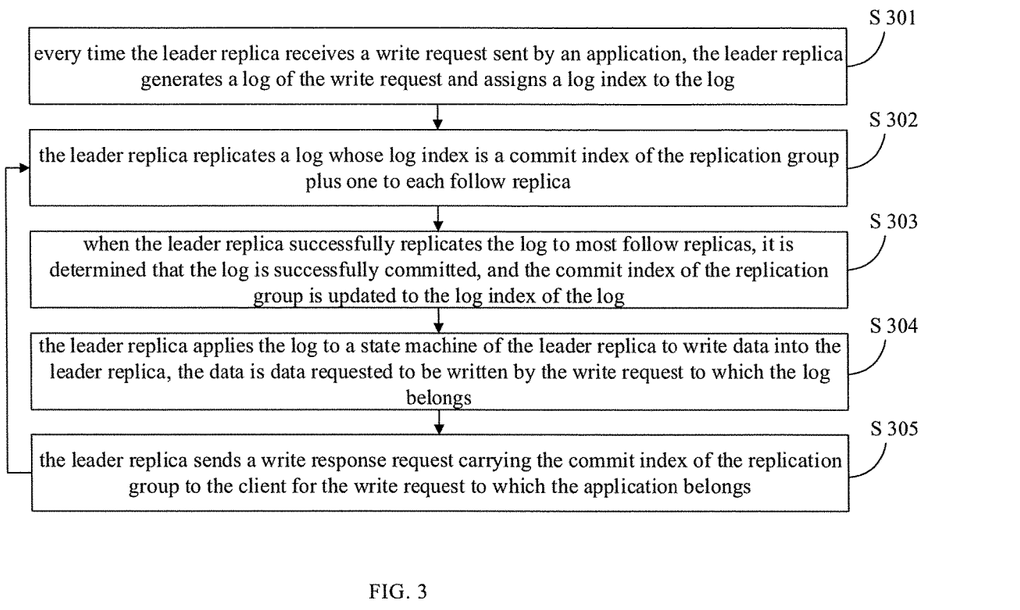
FIG. 3 is a flowchart of a data writing method performed by a leader replica according to an embodiment of the present disclosure.

Each application in the client 110 can send a write request to the leader replica 121*a* of the replication group 121 to write data into each replica of the replication group 121. The following describes the process of responding to the write request of the leader replica in the replication group. As illustrated in FIG. 3, FIG. 3 is a flowchart of a data writing method performed by a leader replica according to an embodiment of the present disclosure, the method can include:

S301: every time the leader replica receives a write request sent by an application, the leader replica generates a log of the write request and assigns a log index to the log.

A log of a write request can be used to indicate data to be written by the write request, or can be used to indicate a write operation to be performed by the write request.

The leader replica generates logs of respective write requests in an ascending order of time of receiving the respective write requests. That is, the earlier the write request is received, the earlier the log is generated. A log index of each log is a log index of a previous log plus one. The previous log refers to the last log generated before the current log is generated, and a log index of the first generated log is "1".

For example, the leader replica receives three write requests in total, which are recorded as write requests 1-3. The leader replica first receives write request 1, then receives write request 2, and finally receives write request 3, then the leader replica first generates a log (hereinafter referred to as log 1) of the write request 1, and assigns a log index "1" to the log 1, generates a log (hereinafter referred to as log 2) of the write request 2, and assigns a log index "2" to the log 2, then generates a log (hereinafter referred to as log 3) of the write request 3, and assigns a log index "3" to the log 3.

S302, the leader replica replicates a log whose log index is a commit index of the replication group plus one to each follow replica.

For example, the commit index of the replication group is "1", the leader replica may replicate a log with a log index of "2", i.e., log 2, to each follow replica. The commit index of the replication group is initially "0". If there is no log whose log index is one more than the commit index of the replication group, it can be determined that all logs are successfully committed.

S303, when the leader replica successfully replicates the log to a certain number of follow replicas, it is determined that the log is successfully committed, and the commit index of the replication group is updated to the log index of the log.

The log is the log whose log index is the commit index of the replication group plus one in S302. The certain number is greater than half of the total number of the follow replicas in the replication group, and is not greater than the total number of the follow replicas in the replication group. For example, the replication group includes a total of 10 follow replicas, the certain number can be any integer between 6 and 10.

For example, the log is log 2. When the leader replica successfully replicates log 2 to a certain number of follow replicas, the leader replica determines that log 2 is successfully committed, and updates the commit index of the replication group to the log index of log 2. That is, the commit index of the replication group is updated to "2".

S304, the leader replica applies the log to a state machine of the leader replica to write data into the leader replica. The data is data requested to be written by the write request to which the log belongs.

For example, the log is log 2. The leader replica can apply log 2 to the state machine of the leader replica, so as to write the data requested by write request 2 to the leader replica.

S305, the leader replica sends a write response request carrying the commit index of the replication group to the client for the write request to which the application belongs, and the aforementioned S302 is executed again.

The commit index of the replication group is updated to the log index of the log in S303. Therefore, the commit index carried in the write response request is the log index of the log. For example, the log is the log 2, the log index carried in the write response request is "2".

After receiving the write response request, the client determines that the write request targeted by the write response request is successfully processed by the replication group, that is, the data requested by the write request is successfully written to the replication group. For the convenience of description, the data successfully written to the replication group is referred to as written data.

Figure 4:
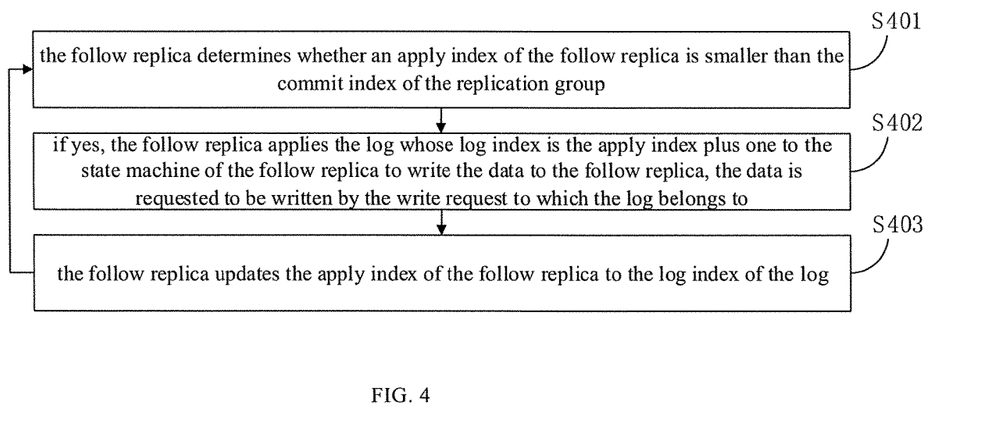
FIG. 4 is a flowchart of a data writing method performed by a follow replica according to an embodiment of the present disclosure.

The following describes a process of responding to a write request of a follow replica in the replication group. As illustrated in FIG. 4, FIG. 4 is a flowchart of a data writing method performed by a follow replica according to an embodiment of the present disclosure, the method can include:

S401, the follow replica determines whether an apply index of the follow replica is smaller than the commit index of the replication group.

The apply index of the follow replicas is "0" initially, and each follow replica maintains its own apply index.

S402, if yes, the follow replica applies the log whose log index is the apply index plus one to the state machine of the follow replica to write the data to the follow replica, the data is requested to be written by the write request to which the log belongs to.

For example, the apply index of the follow replica is "0" and the commit index of the replication group is "2". At this time, the apply index of the follow replica is smaller than the commit index of the replication group. Therefore, the log with a log index of "0" plus one is applied to the state machine of the follow replica, that is, the log 1 is applied to the state machine of the follow replica to write the data requested by the write request 1 into the follow replica.

S403, the follow replica updates the apply index of the follow replica to the log index of the log, and S401 is executed again.

The log is the log whose log index is the apply index plus one in S402. Therefore, this step can also be considered as that the follow replica increments the apply index of the follow replica by one.

It can be understood that the commit index of the replication group is the log index of the last successfully committed log of the replication group, the apply index of the follow replica can be regarded as a log index of a last log applied to the state machine of the follow replica, and the commit and application of logs are performed one by one.

Therefore, if the apply index of the follow replica is smaller than the commit index of the replication group, it can be determined that there is at least one log that is successfully committed but is been applied to the state machine of the follow replica. The data written by the write request to which the at least one log belongs is written to the leader replica but is not written to the follow replica. Therefore, the follow replica may apply the at least one log to the state machine of the follow replica in turn, to write the data written by the write request to which the at least one log belongs into the follow replica, so that the data between the follow replica and the leader replica is consistent.

As described above, it can be seen that for the same log, each replica applies the log to the state machine of the replica. When the client receives the write response request sent by the leader replica for the write request, only the leader replica has applied the log of the write request to its state machine, while the follow replica may have not applied the log of the write request to its state machine. In other words, when the client receives the write response request sent for the write request, the data request to be written by the write request may be written to the leader replica and a part of the follow replicas, but is not written to the other part of the follow replicas, that is, only the leader replica always contains all written data, while the part of the follow replicas may not include all written data.

Therefore, when an application of the client is to read the written data from the replica of the replication group. The required data may be successfully read from only the leader replica and a part of the follow replicas. Therefore, in a possible embodiment, each application of the client only reads data from the leader replica and not from the follow replica.

However, when the application of the client cannot read data from the leader replica for various reasons, such as the network connection between the client and the leader replica fails, or the leader replica is abnormal, or the distributed storage system is temporarily in a state without a leader replica, the application of the client cannot run normally because it cannot read data, which affects the stability of the applications of the client.

Therefore, in the related art, each application of the client can also read data from the follow replica containing all written data. For example, the client can record and update the commit index of the replication group. When data is to be read from the replication group, a read request carrying the recorded commit index is sent to the distributed storage system, so that the distributed storage system can find a replica whose apply index is not smaller than the commit index based on the commit index carried by the read request, and data is read from the found replica.

An apply index of a replica is a log index of the last log applied to a state machine of the replica, and the commit index of the replication group is the log index of the last successfully committed log. Further, as described above, the commit and application of logs are done one by one. Therefore, if the apply index of the replica is not smaller than the commit index of the replication group, it can be determined that all successfully committed logs are applied to the state machine of the replica, that is, the replica contains the data written by the write request to which all successfully committed logs belong. And as described above, when the data requested by a write request is successfully written to the replication group, the log of the write request must be successfully committed, so the replica contains all the written data.

It can be seen that if the apply index of the replica is not smaller than the commit index of the replication group, it can be determined that the replica contains all the written data, so data can be read from the replica. However, only apply indexes of a part of the follow replicas are not smaller than the commit index of the replication group, it takes a certain amount of time to find out a replica whose apply index is not smaller than the commit index of the replication group from all the follow replicas, resulting in low data reading efficiency.

In order to narrow the search range and improve the data reading efficiency, the latest commit index of the target replication group corresponding to the target application can be determined. The latest commit index is used to represent a commit index of the target replication group after the target application last writes data to the target replication group. Then the storage terminal to which the target replication group belongs is drove to read, from the replica whose apply index is not smaller than the latest committed index, the data requested by the target application.

However, in this solution, the target application may write data in the target replication group at least once before the latest commit index can be determined, and the latest commit index cannot be determined before the target application writes data in the target replication group. That is, it may wait for the target application to write data in the target replication group. If the target application is an application with more reads and less writes, it may spend more time waiting for the target application to write data in the target replication group, resulting in low efficiency of reading target data.

It can be seen that the data reading efficiency in the related art is relatively low, and as the above analysis, the data reading method provided in the present disclosure can solve the technical problem.

It can be understood that after an application reads data from the replication group, the application may also write data to the replication group, and the written data is the data that the application is to read subsequently. Based on this, in an possible embodiment, the data reading method provided by the present disclosure also includes:

S106, in response to receiving a write response request generated by the replication group for the application and sent by the storage terminal, the commit index corresponding to the replication group is set as a commit index carried by the write response request in the dedicated mapping table corresponding to the application. The write response request is generated after the application writes data into the replication group, and the write response request carries a commit index of the replication group after the application writes the data into the replication group.

After the application writes data into the replication group, the commit index corresponding to the replication group in the dedicated mapping table corresponding to the application may be set as the commit index of the replication group after the application writes data into the replication group. Therefore, in this embodiment, the commit index corresponding to the replication group in the dedicated mapping table corresponding to the application is the commit index of the target replication group after the application last writes data to the target replication group.

Therefore, if the target application writes data to the target replication group at least once, the determined target commit index is the commit index of the target replication group after the target application last writes data to the target replication group. If an apply index of a replica is not smaller than the target commit index, it can be determined that full data is written to the replica. The full data refers to data written into the target replication group when and before the target application writes data into the target replication group the last time.

The full data includes all the data written in the target replication group by the target application. Therefore, the full data includes the data read by the first read request from the target replication group, that is, the data requested by the first read request can be successfully read from the replica. That is, even if the target application writes data to the target replication group after reading data from the target replication group, data can be accurately read from the replica according to the target commit index determined according to this embodiment. Thus, the reliability and applicability of the data reading method can be effectively improved with the embodiment of the present disclosure.

In order to explain S106 more clearly, the following will give an example description with reference to specific application scenarios. For the convenience of description, there are two applications in the client, respectively marked as Application A and Application B, and there are two replication groups on the storage terminal, respectively marked as Replication Group 1 and Replication Group 2. The group identifier of Replication Group 1 is rg_id1, the group identifier of Replication Group 2 is rg_id2.

If Application A reads data from the leader replica in Replication Group 1, and a commit index carried in a read response request sent by the storage terminal during the current data reading process is Commit index 1, a commit index corresponding to Replication Group 1 in a dedicated mapping table corresponding to Application A is set to Commit index 1. At this time, the dedicated mapping table corresponding to Application A is shown in Table 2:

TABLE 2

| dedicated mapping table corresponding to Application A before writing data | |
|---|---|
| replication group | commit index |
| rg_id1 | Commit index 1 |

Application B reads data from the leader replica of Replication Group 2, and a commit index carried in a read response request sent by the storage terminal during the data reading process is Commit index 2, then a commit index corresponding to Replication Group 2 in a dedicated mapping table corresponding to Application B is set to Commit index 2. At this time, the dedicated mapping table corresponding to Application B is shown in Table 3:

TABLE 3

| dedicated mapping table corresponding to Application B before writing data | |
|---|---|
| replication group | commit index |
| rg_id2 | Commit index 2 |

If the target commit index is determined at this time, the target application is Application A, and the target replication group is Replication Group 1, it can be determined that the commit index corresponding to Replication Group 1 is Commit index 1 by querying the dedicated mapping table corresponding to Application A, thus the target commit index is Commit index 1.

Then, Application A writes first data in Replication Group 1 and writes third data in Replication Group 2, and Application B writes second data in Replication Group 1 and writes fourth data in Replication Group 2. An order of writing the first data to the fourth data from first to last is: the first data, the second data, the third data, and the fourth data.

Figure 5:
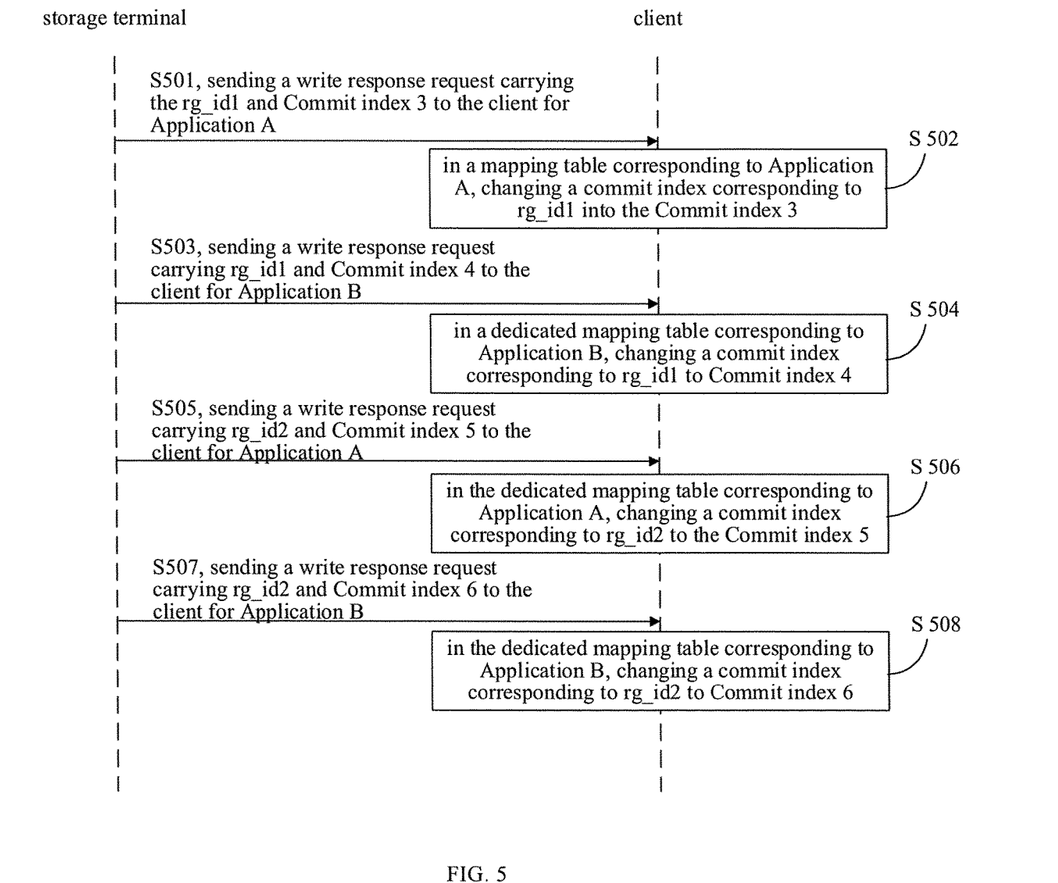
FIG. 5 is a flowchart of an interaction between a client and a storage terminal according to an embodiment of the present disclosure.

In a possible application scenario, after writing the first data to the fourth data, the interaction between the client and the storage terminal can be as shown in FIG. 5, the interaction includes:

S501, after the first data is written to Replication Group 1, the storage terminal sends a write response request carrying the rg_id1 and Commit index 3 to the client for Application A.

Writing the first data to the Replication Group 1 refers to applying, to a state machine of a leader replica of the Replication Group 1, a log of a write request for writing the first data. The Commit index 3 is a commit index of Replication Group 1 after the first data is written to Replication Group 1.

S502, in a mapping table corresponding to Application A, the client changes a commit index corresponding to rg_id1 into the Commit index 3.

S503, after the second data is written to Replication Group 1, the storage terminal sends a write response request carrying rg_id1 and Commit index 4 to the client for Application B.

The Commit index 4 is a commit index of Replication Group 1 after the second data is written to Replication Group 1. The second data is written later than the first data, thus the Commit index 4 is greater than the Commit index 3.

S504, in a dedicated mapping table corresponding to Application B, the client changes a commit index corresponding to rg_id1 to Commit index 4.

S505, after the third data is written to Replication Group 2, the storage terminal sends a write response request carrying rg_id2 and Commit index 5 to the client for Application A.

The Commit index 5 is a commit index of Replication Group 2 after the third data is written to Replication Group 2.

S506, in the dedicated mapping table corresponding to Application A, the client changes a commit index corresponding to rg_id2 to the Commit index 5.

S507, after the fourth data is written to Replication Group 2, the storage terminal sends a write response request carrying rg_id2 and Commit index 6 to the client for Application B.

The Commit index 6 is a commit index of Replication Group 2 after the fourth data is written to Replication Group 2. The fourth data is written later than the third data, thus the Commit index 6 is greater than the Commit index 5.

S508, in the dedicated mapping table corresponding to Application B, the client changes a commit index corresponding to rg_id2 to Commit index 6.

At this time, the dedicated mapping table corresponding to Application A is shown as Table 4:

TABLE 4

| dedicated mapping table corresponding to Application A after writing data | |
|---|---|
| replication group | commit index |
| rg_id1 | Commit index 3 |
| rg_id2 | Commit index 5 |

At this time, the dedicated mapping table corresponding to Application B is shown as Table 5:

TABLE 5

| dedicated mapping table corresponding to Application B after writing data | |
|---|---|
| replication group | commit index |
| rg_id1 | Commit index 4 |
| rg_id2 | Commit index 6 |

If the target commit index is determined at this time, the target application is Application A, and the target replication group is Replication Group 1, it can be determined that the commit index corresponding to Replication Group 1 is Commit index 3 by querying the dedicated mapping table corresponding to Application A, thus the target commit index is Commit index 3.

It can be understood that an application may read the same replication group multiple times. Between twice reading the replication group by the application, other applications may write data into the replication group, resulting in changes in the commit index of the replication group. That is, the commit indexes carried in the read response requests sent by the storage terminal may be different in twice reading the replication group by the application.

Therefore, in a possible embodiment, when an application reads a replication group, if a commit index carried in a read response request sent by the storage terminal is different from a commit index corresponding to the replication group in a dedicated mapping table corresponding to the application, the commit index corresponding to the replication group in the dedicated mapping table corresponding to the application is updated to the commit index carried in the latest read response request.

However, data written by other applications in the replication group may be not the data that the application is to read. Therefore, even if there is no data written into the replication group by other applications stored in the replica, the data requested by the application can be successfully read from the replica. Therefore, the commit index in the dedicated mapping table may be set only according to the commit index carried in the read response request sent by the storage terminal when the application reads the leader replica of the replication group for the first time. Based on this, in another possible embodiment, the aforementioned S101 includes:

When receiving the read response request generated for the application by the replication group and sent by the storage terminal, if the commit index corresponding to the replication group does not exist in the dedicated mapping table corresponding to the application, the commit index corresponding to the replication group in the dedicated mapping table corresponding to the application is changed into the commit index carried by the read response request.

With this embodiment, only when the application reads the leader replica of the replication group for the first time, the step of changing, in the dedicated mapping table corresponding to the application, the commit index corresponding to the replication group into the commit index carried by the read response request. It can avoid updating the dedicated mapping table frequently, thus effectively saving system resources.

In a possible embodiment, in addition to the aforementioned dedicated mapping table, the client also maintains a shared mapping table. Whenever receiving a write response request generated by the replication group for the application from the storage terminal, it is determined whether a commit index carried by the write response request is greater than a commit index corresponding to the replication group in the shared mapping table. If yes, the commit index corresponding to the replication group in the shared mapping table may be updated to the commit index carried by the write response request. If not, the shared mapping table is not updated.

In this implementation, if the commit index corresponding to the target replication group is not recorded in the dedicated mapping table corresponding to the target application, the commit index corresponding to the target replication group in the shared mapping table is determined as the target commit index.

With this embodiment, the shared mapping table can record the commit index of each replication group after all applications write data to each replication group. The shared mapping table is updated only when the commit index carried in the write response request is greater than the recorded commit index. Therefore, the commit indexes recorded in the shared mapping table are the commit indexes of the respective replication groups after the respective replication groups are written into data for the last time. That is, in theory, the commit index corresponding to each replication group recorded in the shared mapping table may be synchronized with the commit index of each replication group.

Therefore, the target commit index corresponding to the target replication group recorded in the shared mapping table is the commit index of the target replication group. Therefore, a replica in the target replication group whose apply index is not smaller than the target commit index can be determined as a replica where all written data is written. Therefore, the data requested by the first read request can be successfully read from the replica. That is, with this embodiment, the target commit index can be recorded in the shared mapping table. When the commit index corresponding to the target replication group is not recorded in the dedicated mapping table corresponding to the target application, the data can be read from the replica where all written data is written, which improves the success rate of data reading.

In order to explain the shared mapping table more clearly, the interaction diagram shown in FIG. 5 is taken as an example. After writing the first data, the shared mapping table is shown in Table 6:

TABLE 6

| shared mapping table after writing the first data | |
|---|---|
| replication group | commit index |
| rg_id1 | Commit index 3 |

After writing the second data, the shared mapping table is shown in Table 7:

TABLE 7

| shared mapping table after writing the second data | |
|---|---|
| replication group | commit index |
| rg_id1 | Commit index 4 |

After writing the third data, the shared mapping table is shown in Table 8:

TABLE 8

| shared mapping table after writing the second data | |
|---|---|
| replication group | commit index |
| rg_id1 | Commit index 4 |
| rg_id2 | Commit index 5 |

After writing the fourth data, the shared mapping table is shown in Table 9:

TABLE 9

| shared mapping table after writing the second data | |
|---|---|
| replication group | commit index |
| rg_id1 | Commit index 4 |
| rg_id2 | Commit index 6 |

In some application scenarios, due to various reasons, the commit index corresponding to the target replication group may not be recorded in the shared mapping table, so the target commit index cannot be determined from the shared mapping table, and thus the data cannot be read from the storage terminal according to the target commit index. In an implementation, the target commit index can be determined in other ways. For example, a request for obtaining the commit index of the target replication group can be sent to the storage terminal, to obtain the commit index of the target replication group from the storage terminal as the target commit index.

In another implementation, if the dedicated mapping table corresponding to the target application does not contain the commit index corresponding to the target replication group, and the shared mapping table does not contain the commit index corresponding to the target replication group, the client sends a third read request without carrying a commit index to the storage terminal. The third read request is used to drive the storage terminal to read the data requested by the first read request from the leader replica of the target replication group.

It can be understood that the data requested by the first read request can be successfully read from the leader replica theoretically because the latest data is written in the leader replica. With this embodiment, data can be read from the leader replica when the commit index corresponding to the target replication group is not recorded in the shared mapping table, thus further improving the success rate of data reading.

Figure 6:
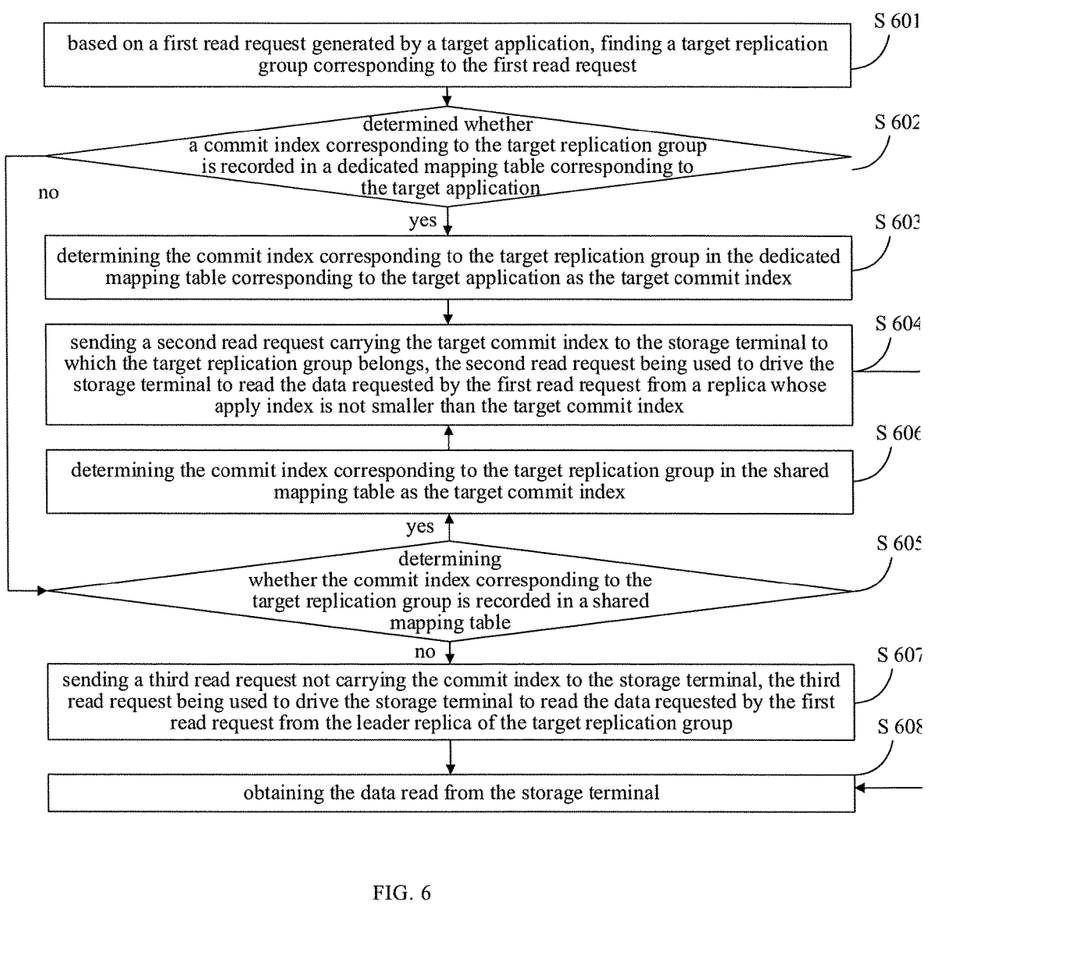
FIG. 6 is a flowchart of a data reading method according to another embodiment of the present disclosure.

As illustrated in FIG. 6, FIG. 6 is a flowchart of a data reading method according to another embodiment of the present disclosure. In this embodiment, the client maintains dedicated mapping tables corresponding to respective applications and a shared mapping table. For the dedicated mapping tables and the shared mapping table, reference may be made to the above related description, and will not be repeated here. The method shown in FIG. 6 may include:

S601, based on a first read request generated by a target application, a target replication group corresponding to the first read request is found.

S602, it is determined whether a commit index corresponding to the target replication group is recorded in a dedicated mapping table corresponding to the target application. If yes, S603 is performed; if not, S605 is performed.

S603, the commit index corresponding to the target replication group in the dedicated mapping table corresponding to the target application is determined as the target commit index.

S604, a second read request carrying the target commit index is sent to the storage terminal to which the target replication group belongs. The second read request is used to drive the storage terminal to read the data requested by the first read request from a replica whose apply index is not smaller than the target commit index.

S605 it is determined whether the commit index corresponding to the target replication group is recorded in a shared mapping table. If yes, S606 is performed; if not, S607 is performed.

S606, the commit index corresponding to the target replication group in the shared mapping table is determined as the target commit index.

S607, a third read request not carrying the commit index is sent to the storage terminal. The third read request is used to drive the storage terminal to read the data requested by the first read request from the leader replica of the target replication group.

S608, the data read from the storage terminal is obtained.

With this embodiment, the target commit index determined from the dedicated mapping table is first used to read data from the storage terminal. When the target commit index cannot be determined from the dedicated mapping table corresponding to the target application, the target commit index determined from the shared mapping table is used to read data from the storage terminal. When the target commit index cannot be determined from the shared mapping table, the data is read from the leader replica of the target replication group. Thus, the data reading efficiency can be effectively improved.

It can be understood that the aforementioned dedicated mapping table and shared mapping table can be maintained by the client or by other devices other than the client. The above embodiments are only examples, which is not limited in the disclosure.

Figure 7:
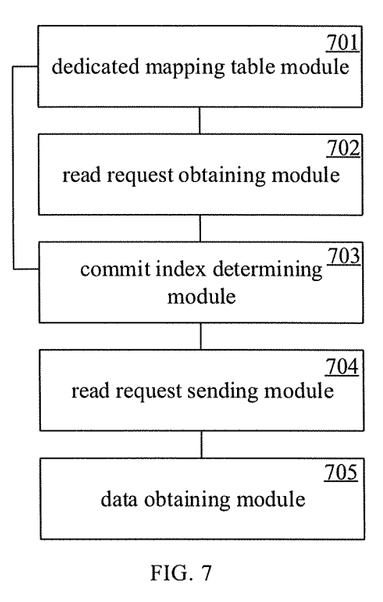
FIG. 7 is a block diagram illustrating a data reading apparatus according to an embodiment of the present disclosure.

As illustrated in FIG. 7, FIG. 7 is a block diagram illustrating a data reading apparatus according to an embodiment of the present disclosure. The apparatus includes: a dedicated mapping table module 701, a read request obtaining module 702, a commit index determining module 703, a read request sending module 704 and a data obtaining module 705.

The dedicated mapping table module 701 is configured to, in response to receiving a read response request generated by a replication group for an application and sent by a storage terminal, set, in a dedicated mapping table corresponding to the application, a commit index corresponding to the replication group as a commit index carried by the read response request. A read request responded by the read response request is configured to read data from a leader replica of the replication group. The read response request is generated after the application reads data from the replication group, and the read response request carries a commit index of the replication group.

The read request obtaining module 702 is configured to search for a target replication group corresponding to a first read request generated by a target application based on the first read request.

The commit index determining module 703 is configured to determine, in a dedicated mapping table corresponding to the target application, a commit index corresponding to the target replication group as a target commit index.

The read request sending module 704 is configured to send a second read request carrying the target commit index to the storage terminal. The second read request is configured to drive the storage terminal to read data requested by the first read request from a replica having an apply index being not smaller than the target commit index.

The data obtaining module 705 is configured to obtain the data read by the storage terminal.

In a possible embodiment, the dedicated mapping table module 701 is further configured to: in response to receiving a write response request generated by the replication group for the application and sent by the storage terminal, set, in the dedicated mapping table corresponding to the application, the commit index corresponding to the replication group as a commit index carried by the write response request. The write response request is generated after the application writes data into the replication group, and the write response request carries a commit index of the replication group after the application writes the data into the replication group.

In a possible embodiment, the dedicated mapping table module 701 is further configured to: in response to the commit index corresponding to the replication group not existing in the dedicated mapping table corresponding to the application, change the commit index corresponding to the replication group in the dedicated mapping table corresponding to the application into the commit index carried by the read response request.

In a possible embodiment, the apparatus further includes: a shared mapping table module, configured to, in response to receiving a write response request generated by the replication group for the application and sent by the storage terminal, and in response to a commit index carried by the write response request being greater than a commit index corresponding to the replication group in a shared mapping table, update the commit index corresponding to the replication group in the shared mapping table to the commit index carried by the write response request.

The commit index determining module 703 is further configured to, in response to no commit index corresponding to the target replication group being in the dedicated mapping table corresponding to the target application, determine the commit index corresponding to the target replication group in the shared mapping table as the target commit index.

The commit index determining module 703 is further configured to, in response to the commit index corresponding to the target replication group existing in the dedicated mapping table corresponding to the target application, determine the commit index corresponding to the target replication group in the dedicated mapping table corresponding to the target application as the target commit index.

In a possible embodiment, the read request sending module 74 is configured to: in response to no commit index corresponding to the target replication group being in the dedicated mapping table corresponding to the target application, and no commit index corresponding to the target replication group being in the shared mapping table, send a third read request to the storage terminal. The third read request is configured to drive the storage terminal to read the data requested by the first read request from a leader replica of the target replication group.

The collection, storage, use, processing, transmission, provision and disclosure of the personal information of users involved in the technical solutions of the disclosure are handled in accordance with relevant laws and regulations and are not contrary to public order and morality.

According to the embodiments of the disclosure, the disclosure provides an electronic device, and a readable storage medium and a computer program product.

Figure 8:
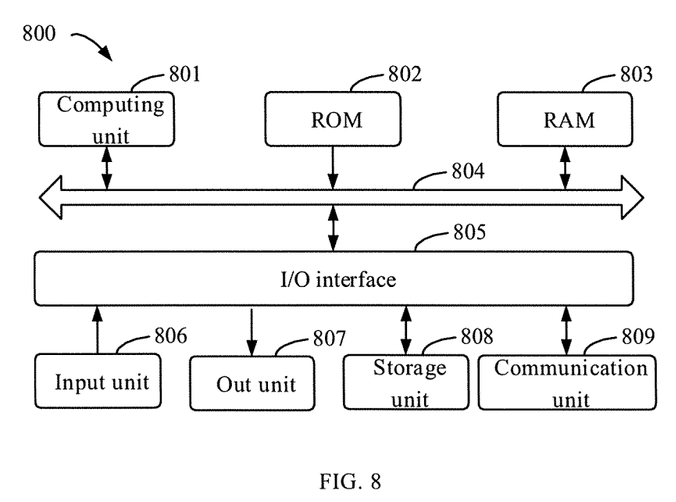
FIG. 8 is a schematic diagram illustrating an electronic device for implementing a data reading method according to an embodiment of the present disclosure.

FIG. 8 is a block diagram of an example electronic device 800 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device 800 includes: a computing unit 801 performing various appropriate actions and processes based on computer programs stored in a read-only memory (ROM) 802 or computer programs loaded from the storage unit 808 to a random access memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an inputting unit 806, such as a keyboard, a mouse; an outputting unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a CPU, a graphics processing unit (GPU), various dedicated AI computing chips, various computing units that run machine learning model algorithms, and a digital signal processor (DSP), and any appropriate processor, controller and microcontroller. The computing unit 801 executes the various methods and processes described above, such as the data reading method. For example, in some embodiments, the above method may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A data reading method, comprising:
in response to receiving a read response request generated by a replication group for an application and sent by a storage terminal, setting, in a dedicated mapping table corresponding to a target application, a commit index corresponding to the replication group as a commit index carried by the read response request, wherein a read request responded by the read response request is configured to read data from a leader replica of the replication group, the read response request is generated after the application reads data from the replication group, and the read response request carries the commit index corresponding to the replication group;
searching for a target replication group corresponding to a first read request generated by the target application based on the first read request;
determining, in the dedicated mapping table corresponding to the target application, a commit index corresponding to the target replication group as a target commit index;
sending a second read request carrying the target commit index to the storage terminal, wherein the second read request is configured to drive the storage terminal to read data requested by the first read request from a replica having an apply index being not smaller than the target commit index; and
obtaining the data read by the storage terminal.

2. The method as claimed in claim 1, further comprising:
in response to receiving a write response request generated by the replication group for the application and sent by the storage terminal, setting, in the dedicated mapping table corresponding to the target application, the commit index corresponding to the replication group as a commit index carried by the write response request, wherein the write response request is generated after the application writes data into the replication group, and the write response request carries a commit index corresponding to the replication group after the application writes the data into the replication group.

3. The method as claimed in claim 1, wherein setting, in the dedicated mapping table corresponding to the target application, the commit index corresponding to the replication group as the commit index carried by the read response request comprises:
in response to the commit index corresponding to the replication group not existing in the dedicated mapping table corresponding to the target application, changing the commit index corresponding to the replication group in the dedicated mapping table corresponding to the target application into the commit index carried by the read response request.

4. The method as claimed in claim 1, further comprising:
in response to receiving a write response request generated by the replication group for the application and sent by the storage terminal, and in response to a commit index carried by the write response request being greater than a commit index corresponding to the replication group in a shared mapping table, updating the commit index corresponding to the replication group in the shared mapping table to the commit index carried by the write response request; and
in response to no commit index corresponding to the target replication group being in the dedicated mapping table corresponding to the target application, determining the commit index corresponding to the target replication group in the shared mapping table as the target commit index;
wherein, determining, in the dedicated mapping table corresponding to the target application, the commit index corresponding to the target replication group as the target commit index, comprises:
in response to the commit index corresponding to the target replication group existing in the dedicated mapping table corresponding to the target application, determining the commit index corresponding to the target replication group in the dedicated mapping table corresponding to the target application as the target commit index.

5. The method as claimed in claim 4, further comprising:
in response to no commit index corresponding to the target replication group being in the dedicated mapping table corresponding to the target application, and no commit index corresponding to the target replication group being in the shared mapping table, sending a third read request to the storage terminal, wherein the third read request is configured to drive the storage terminal to read the data requested by the first read request from a leader replica of the target replication group.

6. An electronic device, comprising:
at least one processor; and
a memory communicatively coupled to the at least one processor; wherein, the memory stores instructions executable by the at least one processor, the instructions are executed by the at least one processor to cause the at least one processor to implement a data reading method, comprising:
in response to receiving a read response request generated by a replication group for an application and sent by a storage terminal, setting, in a dedicated mapping table corresponding to a target application, a commit index corresponding to the replication group as a commit index carried by the read response request, wherein a read request responded by the read response request is configured to read data from a leader replica of the replication group, the read response request is generated after the application reads data from the replication group, and the read response request carries the commit index corresponding to the replication group;

searching for a target replication group corresponding to a first read request generated by the target application based on the first read request;

determining, in the dedicated mapping table corresponding to the target application, a commit index corresponding to the target replication group as a target commit index;

sending a second read request carrying the target commit index to the storage terminal, wherein the second read request is configured to drive the storage terminal to read data requested by the first read request from a replica having an apply index being not smaller than the target commit index; and obtaining the data read by the storage terminal.

7. The electronic device as claimed in claim 6, wherein the method further comprises:

in response to receiving a write response request generated by the replication group for the application and sent by the storage terminal, setting, in the dedicated mapping table corresponding to the target application, the commit index corresponding to the replication group as a commit index carried by the write response request, wherein the write response request is generated after the application writes data into the replication group, and the write response request carries a commit index corresponding to the replication group after the application writes the data into the replication group.

8. The electronic device as claimed in claim 6, wherein setting, in the dedicated mapping table corresponding to the target application, the commit index corresponding to the replication group as the commit index carried by the read response request comprises:

in response to the commit index corresponding to the replication group not existing in the dedicated mapping table corresponding to the target application, changing the commit index corresponding to the replication group in the dedicated mapping table corresponding to the target application into the commit index carried by the read response request.

9. The electronic device as claimed in claim 6, wherein the method further comprises:

in response to receiving a write response request generated by the replication group for the application and sent by the storage terminal, and in response to a commit index carried by the write response request being greater than a commit index corresponding to the replication group in a shared mapping table, updating the commit index corresponding to the replication group in the shared mapping table to the commit index carried by the write response request; and in response to no commit index corresponding to the target replication group being in the dedicated mapping table corresponding to the target application, determining the commit index corresponding to the target replication group in the shared mapping table as the target commit index;

wherein, determining, in the dedicated mapping table corresponding to the target application, the commit index corresponding to the target replication group as the target commit index, comprises:

in response to the commit index corresponding to the target replication group existing in the dedicated mapping table corresponding to the target application, determining the commit index corresponding to the target replication group in the dedicated mapping table corresponding to the target application as the target commit index.

10. The electronic device as claimed in claim 9, wherein the method further comprises:

in response to no commit index corresponding to the target replication group being in the dedicated mapping table corresponding to the target application, and no commit index corresponding to the target replication group being in the shared mapping table, sending a third read request to the storage terminal, wherein the third read request is configured to drive the storage terminal to read the data requested by the first read request from a leader replica of the target replication group.

11. A non-transitory computer-readable storage medium having computer instructions stored thereon, wherein the computer instructions are configured to cause a computer to implement a data reading method, comprising:

in response to receiving a read response request generated by a replication group for an application and sent by a storage terminal, setting, in a dedicated mapping table corresponding to a target application, a commit index corresponding to the replication group as a commit index carried by the read response request, wherein a read request responded by the read response request is configured to read data from a leader replica of the replication group, the read response request is generated after the application reads data from the replication group, and the read response request carries the commit index corresponding to the replication group;

searching for a target replication group corresponding to a first read request generated by the target application based on the first read request;

determining, in the dedicated mapping table corresponding to the target application, a commit index corresponding to the target replication group as a target commit index;

sending a second read request carrying the target commit index to the storage terminal, wherein the second read request is configured to drive the storage terminal to read data requested by the first read request from a replica having an apply index being not smaller than the target commit index; and obtaining the data read by the storage terminal.

12. The non-transitory computer-readable storage medium as claimed in claim 11, wherein the method further comprises:

in response to receiving a write response request generated by the replication group for the application and sent by the storage terminal, setting, in the dedicated mapping table corresponding to the target application, the commit index corresponding to the replication group as a commit index carried by the write response request, wherein the write response request is generated after the application writes data into the replication group, and the write response request carries a commit index corresponding to the replication group after the application writes the data into the replication group.

13. The non-transitory computer-readable storage medium as claimed in claim 11, wherein setting, in the dedicated mapping table corresponding to the target application, the commit index corresponding to the replication group as the commit index carried by the read response request comprises:

in response to the commit index corresponding to the replication group not existing in the dedicated mapping table corresponding to the target application, changing the commit index corresponding to the replication group in the dedicated mapping table corresponding to the target application into the commit index carried by the read response request.

14. The non-transitory computer-readable storage medium as claimed in claim 11, wherein the method further comprises:
- in response to receiving a write response request generated by the replication group for the application and sent by the storage terminal, and in response to a commit index carried by the write response request being greater than a commit index corresponding to the replication group in a shared mapping table, updating the commit index corresponding to the replication group in the shared mapping table to the commit index carried by the write response request; and
- in response to no commit index corresponding to the target replication group being in the dedicated mapping table corresponding to the target application, determining the commit index corresponding to the target replication group in the shared mapping table as the target commit index;
- wherein, determining, in the dedicated mapping table corresponding to the target application, the commit index corresponding to the target replication group as the target commit index, comprises:
- in response to the commit index corresponding to the target replication group existing in the dedicated mapping table corresponding to the target application, determining the commit index corresponding to the target replication group in the dedicated mapping table corresponding to the target application as the target commit index.

15. The non-transitory computer-readable storage medium as claimed in claim 14, wherein the method further comprises:
- in response to no commit index corresponding to the target replication group being in the dedicated mapping table corresponding to the target application, and no commit index corresponding to the target replication group being in the shared mapping table, sending a third read request to the storage terminal, wherein the third read request is configured to drive the storage terminal to read the data requested by the first read request from a leader replica of the target replication group.

* * * * *